United States Patent [19]

Krishnan

[11] Patent Number: 4,990,185

[45] Date of Patent: Feb. 5, 1991

[54] LITHOGRAPHIC INK COMPOSITIONS

[75] Inventor: Ramasamy Krishnan, Sewaren, N.J.

[73] Assignee: Sun Chemical Corporation, Fort Lee, N.J.

[21] Appl. No.: 388,776

[22] Filed: Aug. 2, 1989

[51] Int. Cl.$^5$ .............................................. C09D 11/02
[52] U.S. Cl. ...................................... 106/20; 106/30; 106/31; 106/32
[58] Field of Search .................... 106/20, 23, 30, 31, 106/32

[56] References Cited

U.S. PATENT DOCUMENTS

| 3,776,867 | 12/1973 | Perry et al. | 106/30 |
| 3,803,070 | 4/1974 | Spencer et al. | 106/20 |
| 4,790,880 | 12/1988 | Miller | 106/22 |

FOREIGN PATENT DOCUMENTS 148308 12/1977 Japan .

OTHER PUBLICATIONS

"Introduction to Organic Chemistry", Andrew Streitwieser, Jr., Clayton H. Heathcock, Macmillan Publishing Company (1985), pp. 222 and 223.

*Primary Examiner*—Mark L. Bell
*Assistant Examiner*—Helene Klemanski
*Attorney, Agent, or Firm*—Jack Matalon

[57] ABSTRACT

Glazing on printing press rollers is reduced by use of a lithographic printing ink containing a crown ether such as the cyclic polymeric hexamer of ethylene glycol. The incorporation of the crown ether in the ink is especially helpful in reducing glazing when using lithographic inks wherein the underlying pigment contains calcium, e.g. Calcium Lithol Rubine - Pigment Red 57:1.

12 Claims, No Drawings

LITHOGRAPHIC INK COMPOSITIONS

This invention relates to lithographic ink compositions which result in little or no glazing on printing press rollers. The reduction in glazing is accomplished by incorporating a crown ether in the composition.

BACKGROUND OF THE INVENTION

Glazing on printing press rollers is a frequently-encountered problem in the course of lithographic printing especially with inks employing calcium-based pigments. It is generally acknowledged that deposits on lithographic printing press rollers are primarily calcium phosphate and/or calcium citrate. The calcium ion source is principally from calcium-based pigments in the ink (e.g. lithol rubine) and, to a smaller extent, from hard water. The inks are, of course, oil based whereas the fountain solutions are prepared from available water supplies (which may be quite hard) and contain phosphoric and/or citric acids.

Calcium deposits on the press rollers and blankets must be periodically removed since they will not allow for the carrying of the proper amount of ink. The condition will read out on the paper sheet as light print—neither turning up the ink nor increasing the pressure will correct the problem. In time, glazing will lead to stripping—a condition in which ink rollers refuse to take ink or do not take ink uniformly.

At the present time, the only effective solution for roller glazing is to periodically clean the roller. This is a costly, labor-intensive operation which entails solvents and even scrubbing with pumice for stubborn deposits. Of course, it would be desirable if the calcium deposits could be eliminated in the first instance and it is to this goal to which the present invention is addressed.

Eliminating citric acid and/or phosphoric acid from the fountain solution may eliminate the glazing problem but will lead to other printing problems. Fountain solutions typically contain phosphoric and/or citric acids because of pH requirements as well as the buffering capacity of such acids. Generally, the fountain solution is maintained at a pH level of 3.5 to 5.0. Any lower and the solution becomes too acidic and may affect the drying agent in the ink. With a higher pH, the fountain solution is unable to keep the plate clean, thus leading to scumming and tinting.

The use of calcium chelating agents such a ethylene diamine tetraacetic acid (EDTA) results in several other problems. The principal problem is that color shifts in calcium-based pigments commonly employed in lithographic inks will occur due to the chelating action of EDTA. Also, while printing using a bimetallic plate having a copper image area, the chelated calcium salts will deposit on the image area which results in a blending of the image. Moreover, EDTA must be ground into the ink since it is insoluble, thus leading to production problems.

SUMMARY OF THE INVENTION

The problems alluded to above are avoided and calcium deposition, i.e. "glazing", on printing rollers is reduced or eliminated by incorporating a crown ether in the lithographic ink.

The lithographic ink is conventional in nature, e.g. heat-set or quick-set inks comprising pigment, varnishes, resins, oils, driers, waxes, high boiling solvents, etc. The most troublesome lithographic inks from a glazing point of view and hence those which derive the greatest benefit from the present invention are those containing calcium-based pigments. Examples of such calcium-based pigments include the following:

| Pigment Name | Color Index No. |
| --- | --- |
| Calcium Lithol Rubine | Pigment Red 57:1 |
| Calcium Lithol Red | Pigment Red 49:2 |
| Calcium Red Lake C | Pigment Red 53:1 |
| Calcium BON Red | Pigment Red 52:1 |
| Calcium Permanent Red 2B | Pigment Red 48:2 |

Of course, as mentioned above, the invention is useful even for inks which do not contain calcium-based pigments, since the invention will drastically reduce or eliminate press roller and blanket glazing due to the presence of high calcium concentrations in the available water supply (i.e. "hard" water).

The invention comprises incorporating a crown ether in the lithographic ink. Crown ethers are solids and generally are cyclic polymers of ethylene glycol, $(OCH_2CH_2)n$; they are named in the form x-crown-y, where x is the total number of atoms in the ring and y is the number of oxygens. Preferred for use herein is the 18 crown 6, i.e. the crown ether wherein 18 atoms are present in the ring, of which 6 are oxygen.

Generally, the crown ether will be employed in an amount of about 0.0005 to 0.05 wt. %, preferably 0.001 to 0.01 wt. % based on the weight of the lithographic ink containing the crown ether. The crown ether is ordinarily not soluble in the typical vehicle present in the lithographic ink. It is therefore mixed into the ink with the aid of ultrasonication, ball mills, colloid mills, three-roll mill, high speed impellers and the like.

The following example using a lithographic ink containing calcium lithol rubine pigment (the most commonly used red pigment for lithographic inks) serves to illustrate the invention.

EXAMPLE

A typical lithographic ink containing the ingredients listed below was employed to demonstrate the advantages of the invention:

| | |
| --- | --- |
| Calcium Lithol Rubine Pigment (Pigment Red 57:1) | 12 wt. % |
| Hydrocarbon Resin Binder | 30 wt. % |
| Phenolic Resin Binder | 20 wt. % |
| Magie Oil 470 solvent | 38 wt. % |
| | 100 wt. % |

A dispersion of 0.2 wt. % 18 crown 6 in Magie Oil 470 was prepared by ultrasonication. This dispersion was then added to the lithographic ink in an amount of 0.5 wt. % (the total amount of crown ether in the lithographic ink was thus 0.001 wt. %, based on the weight of the ink). The resulting ink was then run in a commercial heatset press (Harris M 1000B) equipped with brush dampening at 1500 feet per minute for 1 week. No sign of glazing on the press rollers. When the same ink is run without the crown ether being present, roller glazing is observed in a matter of hours.

I claim:

1. A lithographic ink composition for reducing glazing on printing press rollers comprising a lithographic ink and about 0.0005 to 0.05 above to wt. %, based on the weight of the composition, of a crown ether.

2. The composition of claim 1 wherein the crown ether is a cyclic polymer of ethylene glycol.

3. The composition of claim 2 wherein the cyclic polymer contains 18 atoms in the ring, of which 6 atoms are oxygen.

4. The composition of claim 1 wherein the crown ether is employed in an amount of 0.001 to 0.01 wt. %, based on the weight of the composition.

5. The composition of claim 1 wherein the lithographic ink contains a pigment selected from the group consisting of Calcium Lithol Rubine - Pigment Red 57:1, Calcium Lithol Red - Pigment Red 49:2, Calcium Red Lake C-Pigment Red 53:1, Calcium Bon Red - Pigment Red 52:1 and Calcium Permanent Red 2B - Pigment Red 48:2.

6. The composition of claim 5 wherein the pigment comprises Calcium Lithol Rubine - Pigment Red 57:1.

7. A process for reducing glazing on lithographic printing press rollers which comprises carrying out the lithographic printing utilizing a composition comprising a lithographic ink and about 0.0005 to 0.05 wt %, based on the weight of the composition, of a crown ether.

8. The process of claim 7 wherein the crown ether is a cyclic polymer of ethylene glycol.

9. The process of claim 8 wherein the cyclic polymer contains 18 atoms in the ring, of which 6 atoms are oxygen.

10. The process of claim 7 wherein the crown either is employed in an amount of 0.001 to 0.01 wt. %, based on the weight of the composition.

11. The process of claim 7 wherein the lithographic ink contains a pigment selected from the group consisting of Calcium Lithol Rubine Pigment Red 57:1, Calcium Lithol Red - Pigment Red 49:2, Calcium Red Lake C - Pigment Red 53:1, Calcium Bon Red - Pigment Red 52:1 and Calcium Red 2B - Pigment Red 48:2.

12. The process of claim 11 wherein the pigment comprises Calcium Lithol Rubine - Pigment Red 57:1.

* * * * *